United States Patent
Jähn et al.

(10) Patent No.: US 12,407,507 B2
(45) Date of Patent: Sep. 2, 2025

(54) METHOD FOR DATA TRANSFER AND COMMUNICATION SYSTEM

(71) Applicant: Siemens Mobility GmbH, Munich (DE)

(72) Inventors: Marcel Jähn, Braunschweig (DE); Matthias Lorenz, Vechelde (DE); Benjamin Schilling, Wolfenbüttel (DE)

(73) Assignee: Siemens Mobility GmbH, Munich (DE)

(*) Notice: Subject to any disclaimer, the term of this patent is extended or adjusted under 35 U.S.C. 154(b) by 254 days.

(21) Appl. No.: 17/914,846

(22) PCT Filed: Mar. 15, 2021

(86) PCT No.: PCT/EP2021/056482
§ 371 (c)(1),
(2) Date: Sep. 27, 2022

(87) PCT Pub. No.: WO2021/190969
PCT Pub. Date: Sep. 30, 2021

(65) Prior Publication Data
US 2023/0145277 A1    May 11, 2023

(30) Foreign Application Priority Data
Mar. 27, 2020   (DE) ..................... 10 2020 204 023.0

(51) Int. Cl.
*H04L 9/08* (2006.01)
*H04L 9/06* (2006.01)
(Continued)

(52) U.S. Cl.
CPC .......... *H04L 9/0891* (2013.01); *H04L 9/0637* (2013.01); *H04L 9/0822* (2013.01);
(Continued)

(58) Field of Classification Search
CPC ..... H04L 9/0891; H04L 63/068; H04L 63/08; H04L 9/16; H04L 9/0819; H04L 63/0435;
(Continued)

(56) References Cited

U.S. PATENT DOCUMENTS 6,775,382 B1   8/2004   Al-Salqan
10,735,183 B1 *  8/2020   Mehta .................. H04L 9/0637
(Continued)

FOREIGN PATENT DOCUMENTS

| CN | 110027596 A  * | 7/2019 | .......... B61L 27/0038 |
| DE | 10121819 A1 | 11/2002 | |

(Continued)

*Primary Examiner* — Kyung H Shin
(74) *Attorney, Agent, or Firm* — Laurence A. Greenberg; Werner H. Stemer; Ralph E. Locher

(57) ABSTRACT

A method includes: A) establishing a data connection between a first communication partner and a second communication partner by use of a connection key, B) the first communication partner and/or the second communication partner encrypts the connection key for the data connection by use of an additional key, and C) the first communication partner transmits a message, which contains an unencrypted part and a part encrypted by use of the connection key, to the second communication partner. The unencrypted part of the message contains the connection key encrypted by means of the additional key.

8 Claims, 2 Drawing Sheets

(51) Int. Cl.
*H04L 9/14* (2006.01)
*H04L 9/40* (2022.01)
*H04L 47/12* (2022.01)

(52) U.S. Cl.
CPC .............. *H04L 9/0825* (2013.01); *H04L 9/14* (2013.01); *H04L 47/12* (2013.01); *H04L 63/0442* (2013.01)

(58) Field of Classification Search
CPC . H04L 67/1074; H04L 9/0637; H04L 63/045; H04L 9/50; H04L 9/0822; H04L 9/3239; H04L 9/0894; H04L 47/12; H04L 67/104; B61L 27/40; B61L 27/20; H04W 88/06; H04W 76/23
See application file for complete search history.

(56) References Cited

U.S. PATENT DOCUMENTS

| | | |
|---|---|---|
| 2006/0129847 A1 | 6/2006 | Pitsos |
| 2009/0157551 A1 | 6/2009 | Bellwood et al. |
| 2010/0266127 A1 | 10/2010 | Rouse et al. |
| 2016/0021007 A1* | 1/2016 | Shuman ................. H04L 47/12 370/235 |
| 2017/0365109 A1 | 12/2017 | Tseng et al. |
| 2019/0306132 A1* | 10/2019 | Le Van Gong ....... H04L 9/0891 |

FOREIGN PATENT DOCUMENTS

| | | |
|---|---|---|
| WO | 0029962 A1 | 5/2000 |
| WO | 2004028077 A1 | 4/2004 |

\* cited by examiner

METHOD FOR DATA TRANSFER AND COMMUNICATION SYSTEM

FIELD AND BACKGROUND OF THE INVENTION

A method for data transfer is disclosed. Furthermore, a communication system is disclosed.

SUMMARY OF THE INVENTION

One object to be achieved consists in disclosing a method for data transfer, with which it is possible for a third party to efficiently log and check a data stream in the case of encrypted communication.

This object is achieved, inter alia, by a method for data transfer and by a communication system having the features of the independent claims. Preferred developments are the subject matter of the dependent claims.

In the method described here, communication takes place between two communication partners, with a data connection between the communication partners being cryptographically secured. A key for decrypting transmitted data packets is made known by one of the two communicating partners to a third communication partner, known as an archive body or inspection body, in order to archive the data packets and/or to be able to check for malware.

In at least one embodiment, the method comprises the following steps, preferably in the disclosed order:
  A) establishing a data connection with a connection key between a first communication partner and a second communication partner,
  B) encrypting the connection key for the data connection by the first communication partner and/or by the second communication partner with an additional key,
  C) sending a message containing an unencrypted part and a part encrypted with the connection key from the first communication partner to the second communication partner, wherein the unencrypted part of the message contains the connection key encrypted with the additional key.

The terms connection keys and additional keys do not necessarily relate only to a single key part, but optionally also comprise key pairs. The connection key and/or the additional key are thus either a symmetrical or an asymmetrical key part of a cryptographic connection or also a key pair of symmetrical or asymmetrical key parts.

Most digital communication is encrypted. This is usually achieved by means of TLS, with asymmetrical keys being used to agree a symmetrical key that is used by both communication partners for encryption and decryption. A key of this kind is also referred to as session key. The key is agreed in particular via a Diffie-Hellman key exchange or a Diffie-Hellman-Merkle key exchange, DHM key exchange or DHM protocol for short. TLS stands for transport layer security. Even if the communication including the key agreement is intercepted, it is not possible for an eavesdropper in such a procedure to decrypt the data communication. The agreed symmetrical key can be different for each new communication link.

In some cases, for example when operating a signal network or for financial transactions, the digital communication must be archived for legal reasons. This is conventionally achieved by an archiving third party, which records and stores the data communication, for example by means of a monitor port of a switch. If the data communication is encrypted, the archived data cannot be used directly for audits, and legal and/or compliance requirements can no longer be met.

For IT security reasons, it is often necessary to inspect data communication for whether malware is included or whether the data stream is compromised in order to detect attacks. This takes place, for example, by means of a deep packet inspection algorithm and/or by means of a NIDS, in other words by means of a network intrusion detection system. In this case, too, the data communication is often monitored via a monitor port. However, in the case of an encrypted communication, for instance a deep packet inspection is no longer possible and the ability to detect attacks is reduced.

Alternative possibilities of making data archiving or data inspection possible for a third party are to store a key via a separate communication channel. That is to say, a communication partner sends the third party the, for example, symmetrical key used for the encryption. In this case, however, an additional data connection is required.

A further alternative possibility is to check only the integrity by means of a cipher. However, this is not an option when transmitting confidential data, for example personal data. Moreover, this is no longer supported by the currently existing ciphers in TLS 1.3.

Another alternative possibility is to use symmetrical encryption with a known key. However, this no longer corresponds to the prior art for cryptographically secured connections.

Finally, an alternative possibility is to use a man-in-the-middle approach and/or a proxy. In this case, all connections between the third parties and the third party interrupt the direct connection between the communication partners. Both communication partners are connected directly to the third party and only the connection directly to the third party is encrypted, so no end-to-end encryption is present.

The method described here preferably has the following steps, in particular in the disclosed order:
  1. A connection key, in particular a session key, is agreed, for instance via a key exchange such as a Diffie-Hellman key exchange.
  2. A communication partner encrypts the session key so it can only be decrypted by the third party, for example by means of an asymmetrical key with a public key of the third party. The third party is, for example, an archiving authority. Optionally, the key of an X.509 certificate of the third party is used. This has the additional advantage that it is ensured that apart from the first and second communication partners as sender/receiver, only the third party as a listener can decrypt the data traffic.
  3. The encrypted session key is transparently communicated within the data connection in a non-encrypted part of the underlying communication protocol, for example in a TCP option, with the next message. Optionally, the X.509 certificate of the third party is also sent in the TCP options, so the communication partner that has not sent the session key can decide whether the third party can be trusted.
  4. In the case of an archiving authority, the third party stores, logs and/or archives preferably the entire data communication, in particular also the TCP option. Optionally, in this case, everything is stored in encrypted form, so the data contained is not processed. The session key is extracted and separately stored and/or processed as a further option.

5. Optionally, the third party decrypts the data communication in real time, also referred to as on the fly, and stores and/or processes the decrypted data.

As described in the introduction, the third party can not only be an archiving authority, but also an inspection body in order to check the data stream for attacks.

The method described here offers, in particular, the following advantages:

The end-to-end encryption between the communication partners is still intact.

Only one communication partner needs to support the method; for the other communication partner, the procedure can be transparent.

Almost no additional data stream and/or overhead is required, so the bandwidth is strained a little more and hardly any additional method steps have to be carried out.

The method from the prior art can be used, for example, with existing archiving systems since all the additional data within the data connection, also referred to as inline, is transmitted.

No additional channel is required for the key transmission to the third party.

Only trusted third parties can decrypt the data traffic.

Optionally, decryption by the third party takes place only in justified cases, for example in the case of an audit.

The archived, stored data can be stored unchanged and encrypted.

For the communication partner that does not transmit the connection key to the third party, it is optionally clearly apparent that the connection key has been communicated to the third party. However, this is not the case when man-in-the-middle approaches or out-of-line approaches, also referred to as out-of-band approaches, are used.

With the method described here, it is easier to satisfy rules such as GDPR, General Data Privacy Regulation.

It is possible to achieve data storage that satisfies legal requirements for encrypted data traffic as well.

Deep packet inspection and NIDS are compatible with the method described here.

High acceptance for the method described here for cryptographic connections is possible since it is obvious for both communication partners that a third party as a listener is incorporated into the communication and which third party is involved. This applies in particular if an X.509 certificate of the third party is also sent in the message. On the other hand, previous approaches with a third party for a cryptographic connection are usually not accepted since secret eavesdropping is difficult to prevent, unlike in the method described here.

It is possible to license the method to users, which in particular have to satisfy legal requirements for archiving the communication, such as in the finance sector.

According to at least one embodiment, a third communication partner is intentionally involved as a listener in the data connection. The third communication partner can also be referred to as the third party for short. That is to say, the third communication partner is specifically included in the data connection by first and/or by the second communication partner.

According to at least one embodiment, the additional key is known to the third communication partner. This can be achieved in that the additional key is transmitted in encrypted form in the unencrypted part of the message, or that the additional key is made known outside this method, or that the additional key is the public part of an asymmetrical key pair which is allocated to the third communication partner for example the public key of its X.509 certificate.

According to at least one embodiment, the third communication partner logs and/or inspects the message, in particular on behalf of the first communication partner and/or of the second communication partner. The third communication partner thus intentionally fulfills a further function in the data connection, in particular archiving and/or protection from attacks.

According to at least one embodiment, the method comprises a step D). In step D), the third communication partner decrypts the connection key encrypted with the additional key from the unencrypted part of the message. It is thus possible for the third communication partner to decrypt and thus read the encrypted part of the message in real time or in a time-delayed manner.

According to at least one embodiment, the third communication partner stores the encrypted part of the message and/or the decrypted connection key and/or the connection key which is still encrypted with the additional key. It is possible that the third communication partner decrypts the encrypted part of the message at a later instant.

In particular, the third communication partner decrypts the encrypted part of the message only if a request for this is made, for example by an external supervisory authority. The supervisory authority can be the first or the second communication partner or else a further authority.

According to at least one embodiment, the third communication partner decrypts the encrypted part of the message by means of the connection key in real time. In real time means, in particular, that no or no significant time delay relative to a decryption of the message by the first and/or by the second communication partner exists. This results in effective protection against attacks with the aid of the third communication partner. It is possible for a decryption by the third communication partner for detecting attacks to precede a decryption of the message by the receiver. That is to say, decryption is carried out for instance by the second communication partner, for example only when a release for this is effected by the third communication partner.

According to at least one embodiment, the additional key is a public key of a certificate of the third communication partner or the additional key contains such a key. The certificate is in particular an X.509 certificate.

According to at least one embodiment, the unencrypted part of the message with the connection key is a part of a transmission control protocol overhead that is self-defined in particular by an operator of the data connection. For example, this part of the message is a self-defined option in a TCP header. TCP stands for Transmission Control Protocol.

According to at least one embodiment, the connection key is a session key of the data connection. That is to say, the connection key is valid only for a single session and/or only for a certain time. Step A) can thus be carried out several times, even several times during the existence of the data connection.

Furthermore, a communication system is disclosed. The communication system is adapted for a method as described in connection with one or more of the above-mentioned embodiment(s). Features of the communication system are therefore also disclosed for the method, and vice versa.

In at least one embodiment, during operation, the communication system at least temporarily carries out a method described above. In this case, the data connection is partially or completely wireless or also a wired connection.

According to at least one embodiment, the communication system is part of a rail network infrastructure. The first communication partner and/or the second communication partner is preferably selected from the following group: an interlocking, a control center such as an ETCS control center, an axle counter, a trackside signal, a switch, a rail vehicle.

That is to say, the first and/or the second communication partner can be an RBC, Radio Block Center, in other words an ETCS control center, where ETCS stands for European Train Control System.

The above-mentioned properties, features and advantages of the invention and the manner in which they are achieved will be explained in further detail by the following description of the exemplary embodiments of the invention in conjunction with the corresponding figures, wherein

DETAILED DESCRIPTION OF THE INVENTION

Figure 1:
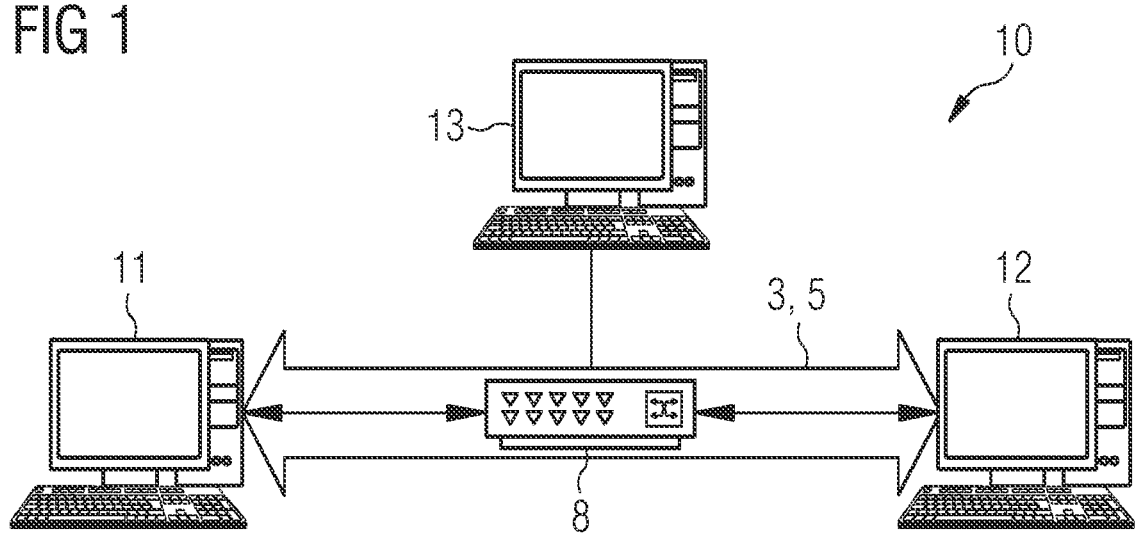
FIG. 1 shows a schematic representation of an exemplary embodiment of a communication system described here.

FIG. 1 shows an exemplary embodiment of a communication system 10. The communication system 10 comprises a first communication partner and a second communication partner 12. Between the communication partners 11, 12 as transmitter and receiver there is a data connection 3 for preferably bidirectional, encrypted exchange of messages 5.

Furthermore, the communication system 10 comprises a third communication partner 13. The third communication partner 13 participates in the data connection 3 via a connection component 8. The connection component 8 is, for example, a monitor port of a router. The third communication partner 13 archives and/or inspects the exchanged messages 5. That is to say, the third communication partner 13 preferably does not directly participate in the communication between the communication partners 11, 12 and is a listener.

It is possible that the communication partners 11, 12, 13 operate automatically or partially automatically. An intervention by operating personnel in the communication is thus not necessary. The communication partners 11, 12, 13 are, for example, computers or sensors or else actuators.

Figure 2:
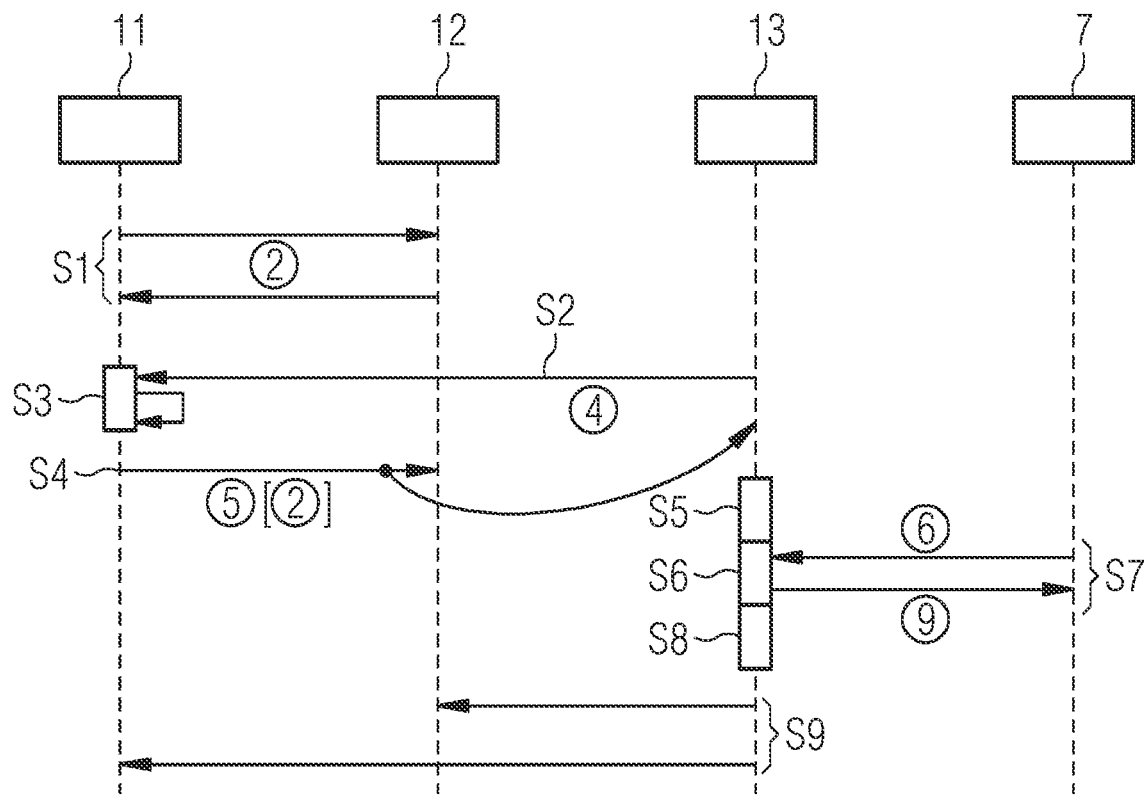
FIG. 2 shows a schematic flowchart of an exemplary embodiment of a method described here.

FIG. 2 describes an operating method for a communication system 10. In a first method step S1, a connection key 2 is agreed between the first and the second communication partners 11, 12, for example via a Diffie-Hellman key exchange. The connection key 2 is in particular a session key.

In an optional method step S2, the first communication partner 11 receives an additional key 4. For example, the additional key 4 is transmitted from the third communication partner 13 to the first communication partner 11. The additional key 4 is, for example, a public key of an X.509 certificate of the third communication partner 13.

In method step S3, the connection key 2 is encrypted by the first communication partner with the aid of the supplementary key 4.

Then, in method step S4, the message 5 is sent to the second communication partner 12. The message 5 contains the connection key 2 encrypted with the additional key 4. The encrypted connection key 2 is contained in an unencrypted part of the message 5, see also FIG. 3. The encrypted parts 52 of the message are encrypted with the connection key 2.

As illustrated in FIG. 1, the message 5 also goes to the third communication partner 13. One or more method step(s) S5, S6, S7, S8, S9 can be carried out by the third communication partner 13, the listener, after receiving the message 5.

In the optional method steps S5, the message 5 and the connection key 2 are stored. The message 5 and/or the connection key 2 can be stored in an encrypted or a decrypted manner. Preferably, at least the message 5 is only archived in an encrypted and unprocessed manner in this step S5. Due to the fact that the connection key 2 is also stored at least in encrypted form, the message 5 can be decrypted later.

The message 5 is decrypted in particular in a later method step S6. It is possible for method step S6 to be carried out only after receiving a request 6. The request 6 goes in a method step S7 through a supervisory authority 7, which is external, for example. Deviating from the illustration in FIG. 2, the supervisory authority 7 can also be realized by the first and/or by the second communication partner(s) 11, 12. Optionally, the third communication partner 13 then returns information 9, for instance to the supervisory authority 7. This information 9 can be issued within the method step 7.

In the optional method steps S8, the third communication partner 13 checks the message 5 for attacks. This check can be carried out in real time.

Furthermore, an optional method step S9 is illustrated in FIG. 2. In method steps S9, the third communication partner 13 provides an acknowledgement to the first and/or to the second communication partner(s) 12. The acknowledgement can contain, for example, that the message 5 has been correctly received by the third communication partner 13 and that no renewed transmission of the message 5 is required from the point of view of the third communication partner 13. Alternatively or additionally, the acknowledgement indicates that no attack is contained in the message 5 and/or that the message 5 can be decrypted without danger by the second communication partner 12 as a recipient of the message 5.

Figure 3:
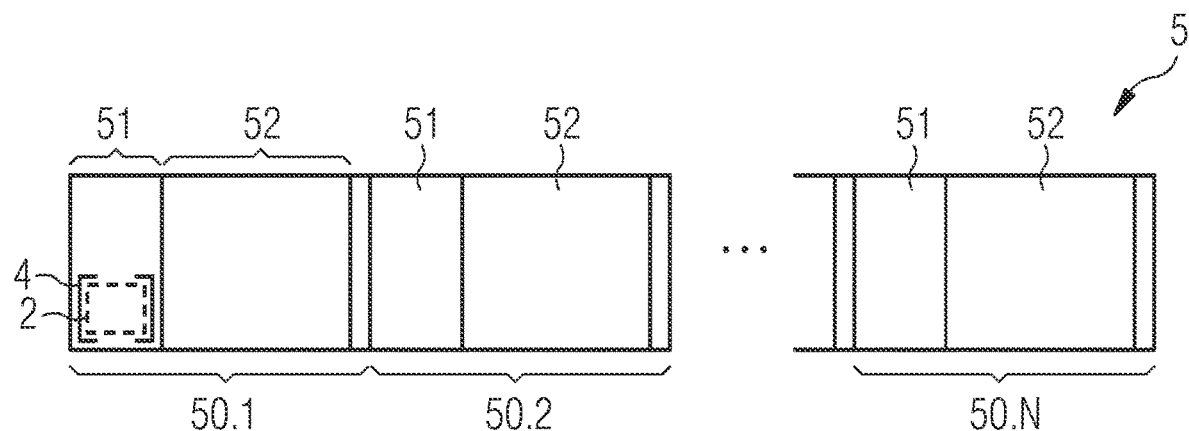
FIG. 3 shows a schematic representation of a message for exemplary embodiments of methods described here.

FIG. 3 schematically illustrates an exemplary structure of the message 5. The message 5 comprises N data packets 50.1, 50.2 to 50.N, where N is a natural number greater than or equal to one. The data packets preferably each contain an unencrypted part 51 and an encrypted part 52. Deviating from the illustration in FIG. 3, it is likewise possible for only the first data packet 50.1 or only some of the data packets to contain an unencrypted part 51. The encrypted parts 52 each contain a payload of the relevant data packet, the unencrypted parts 51 preferably each represent an overhead or header.

The connection key 2 encrypted with the additional key 4 is contained in particular in the unencrypted part 51 of only the first data packet 50.1. This region of the unencrypted part 51 is in particular a self-defined TCP option. Deviating from the illustration of FIG. 3, the encrypted connection key 2 can also be transmitted several times.

Since the additional key 4 is known to the third communication partner 13 and the connection key 2 is located in the non-encrypted part 51, the third communication partner 13 can decrypt the connection key 2 and thus also access the encrypted parts 52 of the message 5.

Figure 4:
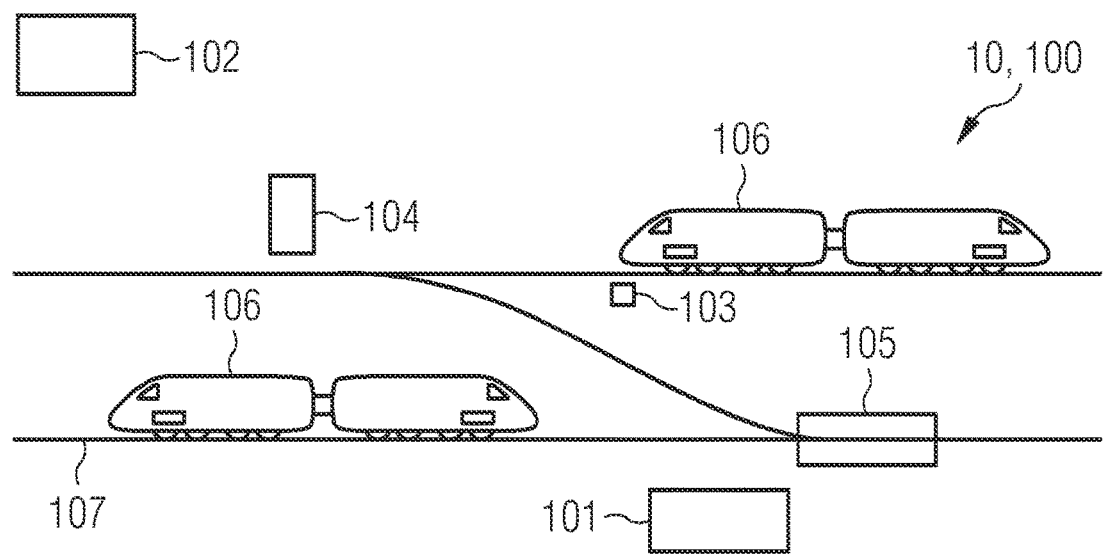
FIG. 4 shows a schematic representation of an exemplary embodiment of a communication system described here in a rail network infrastructure.

FIG. 4 illustrates a rail network infrastructure 100. The rail network infrastructure 100 comprises the communication system 10 and a rail network 107. The first, second and/or third communication partners are formed in the rail network infrastructure 100, in particular by interlockings 101, by an ETCS control center 102, by axle counters 103, by trackside signals 104, by switches 105 and/or by rail vehicles 106.

Due to the third communication partner 13, data traffic between the components of the rail network infrastructure 100 can be logged and recorded. The data connection between the components of the rail network infrastructure 100 is wired or also wireless.

Although the invention has been illustrated and described in detail on the basis of exemplary embodiments, the invention is not limited to the disclosed embodiments and the specific combinations of features explained therein. Further variations of the invention can be obtained by a person skilled in the art without departing from the scope of the claimed invention.

LIST OF REFERENCE CHARACTERS 2 connection key for the data connection
3 data connection
4 additional key
5 message
50.1, 50.2, 50.N data packet of the message
51 unencrypted part of the message
52 encrypted part of the message
6 request to decrypt the message
7 supervisory authority
8 connection component
9 information about the message
10 communication system
11 first communication partner (sender)
12 second communication partner (receiver)
13 third communication partner (listener)
100 rail network infrastructure
101 interlocking
102 ETCS control center
103 axle counter
104 trackside signal
105 switch
106 rail vehicle
107 rail network
S1-S9 method steps

The invention claimed is:

1. A method for data transfer, which comprises the following steps of:
   establishing a data connection with a connection key between a first communication partner and a second communication partner;
   encrypting the connection key for the data connection by the first communication partner and/or by the second communication partner with an additional key;
   sending a message containing an unencrypted part and a part encrypted with the connection key from the first communication partner to the second communication partner, wherein the unencrypted part of the message contains the connection key encrypted with the additional key;
   wherein a third communication partner is intentionally participating as a listener in the data connection and the additional key is known to the third communication partner, said third communication partner being specifically included in the data connection by at least one of said first communication partner or said second communication partner, said third communication partner at least one of logging or inspecting the message on behalf of said at least one of said first communication partner or said second communication partner; and
   decrypting, by the third communication partner, the connection key encrypted with the additional key from the unencrypted part of the message, so it is possible for the third communication partner to read the encrypted part of the message.

2. The method according to claim 1, which further comprises storing in the third communication partner, the encrypted part of the message and a decrypted connection key and/or the connection key still encrypted with the additional key, wherein the third communication partner only decrypts the encrypted part of the message when a request for decryption is made by a supervisory authority.

3. The method according to claim 1, which further comprises decrypting, via the third communication partner, the encrypted part of the message in real time by means of the connection key.

4. The method according to claim 1, wherein the additional key is a public key of a certificate of the third communication partner or contains the public key.

5. The method according to claim 1, wherein the unencrypted part of the message with the connection key is a part of a transmission control protocol overhead which is self-defined by an operator of the data connection.

6. The method according to claim 1, wherein the connection key is a session key of the data connection.

7. A communication system, comprising:
   a first communication partner;
   a second communication partner;
   a third communication partner intentionally participating as a listener in a data connection between the first communication partner and the second communication partner;
   the communication system configured for performing the method according to claim 1; and
   said data connection is an at least partially wireless or wired connection.

8. The communication system according to claim 7, wherein:
   the communication system is part of a rail network infrastructure; and
   said first communication partner and/or said second communication partner is selected from the group consisting of: an interlocking, a European train control system control center, an axle counter, a trackside signal, a switch, and a rail vehicle.

* * * * *